May 6, 1941.    H. C. BOWEN    2,241,112

FLUID PRESSURE BRAKING SYSTEM

Filed March 24, 1938

INVENTOR.
HERBERT C. BOWEN
BY
Williams, Bradbury, McCaleb & Hinkle
ATTORNEYS.

Patented May 6, 1941

2,241,112

UNITED STATES PATENT OFFICE 2,241,112

FLUID PRESSURE BRAKING SYSTEM

Herbert C. Bowen, Detroit, Mich., assignor to Hydraulic Brake Company, Detroit, Mich., a corporation of California Application March 24, 1938, Serial No. 197,796

5 Claims. (Cl. 60—54.6)

This invention relates to fluid pressure braking systems.

Broadly the invention comprehends a fluid pressure braking system for a motor vehicle including a fluid pressure producing device operative to maintain a predetermined pressure on the fluid in the cylinder so that lost motion on the initial operation of the system may be avoided.

An object of the invention is to provide a fluid pressure producing device having means for maintaining a predetermined pressure on the fluid in the compression chamber, and means compensating for expansion and contraction of the fluid due to temperature changes.

Another object of the invention is to provide a fluid pressure producing device in which the conventional compensating port providing a communication between the compression chamber and the reservoir of the device is eliminated.

Another object of the invention is to provide a fluid pressure producing device, including a cylinder and a piston movable in the cylinder for producing pressure, having embodied therein means for maintaining a predetermined pressure on the fluid in the cylinder and means compensating for expansion and contraction of the fluid due to temperature changes.

Other objects and advantages of the invention will appear from the following description taken in connection with the drawing forming a part of this specification, and in which—

Figures 1, 2:
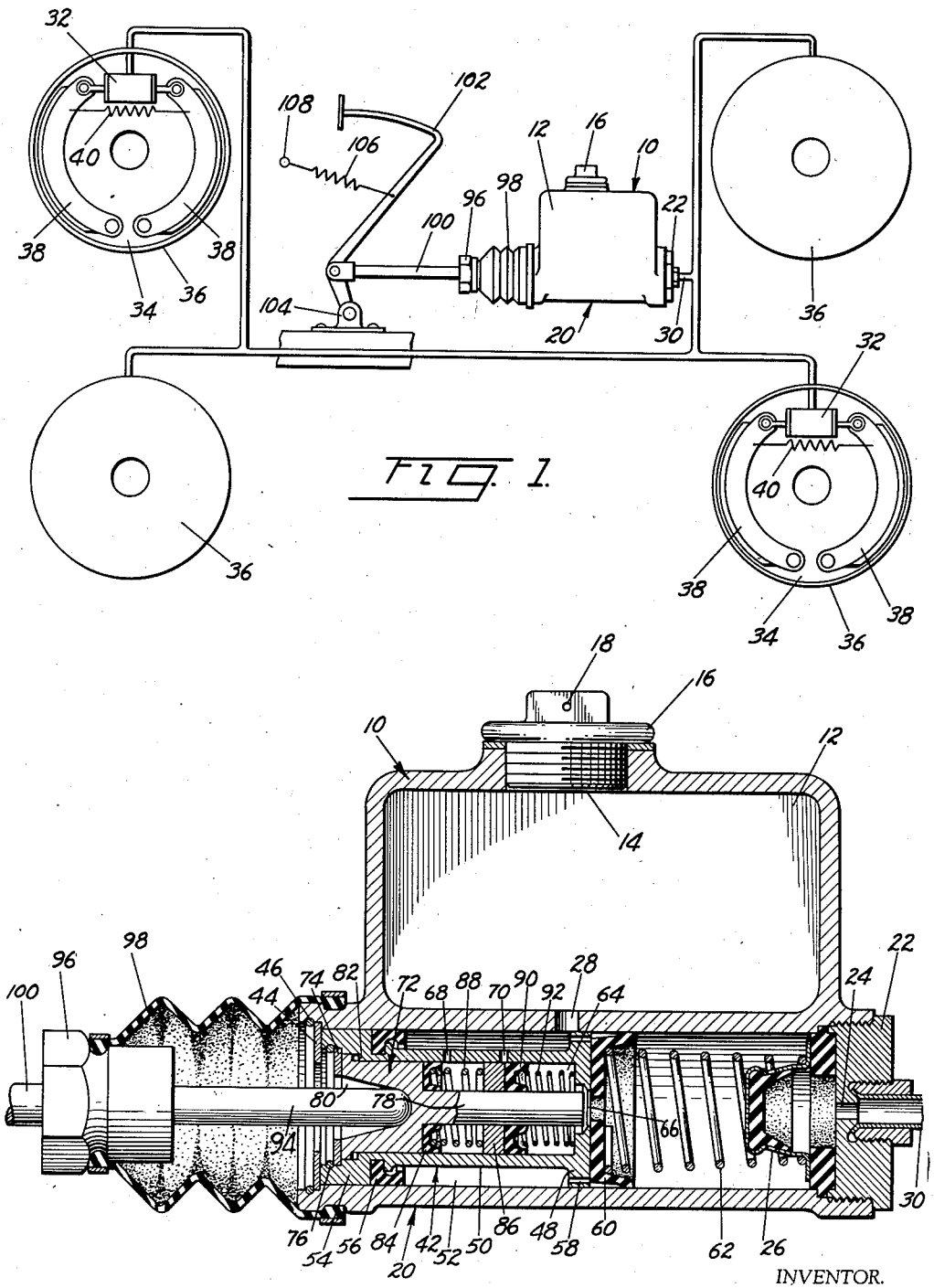
Fig. 1 is a schematic view of a braking system embodying the invention.
Fig. 2 is a vertical sectional view of the fluid pressure producing device.

Referring to the drawing, 10 represents a fluid pressure producing device including a reservoir 12 having a filling opening 14 normally closed as by a plug 16 having openings 18 for venting the reservoir to the atmosphere. A cylinder 20 formed at the base of the reservoir has one end open and the other end closed as by a head 22 provided with a discharge port 24 controlled by a two-way valve 26, and arranged in the wall of the cylinder is a port 28 providing a communication between the cylinder and the reservoir.

A fluid pressure delivery pipe or conduit 30 suitably connected to the discharge port 24 of the cylinder has branches connected respectively to fluid pressure actuated motors 32, preferably arranged in pairs, one pair for actuating brakes associated with the front wheels of a vehicle and another pair for actuating brakes associated with the rear wheels of the vehicle.

The brakes may be of any conventional type. As shown, each of the brakes includes a fixed support or backing plate 34, adapted to be secured to an axle or to an axle housing, a rotatable drum 36 associated with the backing plate adapted to be secured to a wheel, a pair of corresponding interchangeable friction elements or shoes 38 pivoted on the backing plate for cooperation with the drum, a retractile spring 40 connecting the shoes, and a motor corresponding to the motors 32 connected to the shoes and operative to actuate the shoes into engagement with the drum against the resistance of the retractile spring.

A piston 42 reciprocable in the cylinder 20 is held against displacement by a washer 44 seated on an annular shoulder in the open end of the cylinder, and secured in place as by a retaining ring 46 seated in a groove in the wall of the cylinder. The piston 42 includes a head 48, a reduced body portion 50 providing in conjunction with the wall of the cylinder 20 an annular chamber 52 communicating with the reservoir 12 by way of the port 28, and a skirt 54 having seated thereon a sealing cup 56 for inhibiting seepage of fluid from the cylinder past the piston. The head 48 of the piston has spaced passages 58 therethrough providing communications between the annular chamber 52 and that portion of the cylinder forward of the piston. A sealing cup 60 seated on the head of the piston controls the passages 58, and a spring 62 interposed between the sealing cup 60 and the two-way valve 26 retains the cup and valve against displacement and also serves to return the piston to its retracted position.

The piston is bored to provide a chamber 64 having a port 66 located in the head of the piston providing a communication between the chamber 64 and that portion of the cylinder 20 forward of the piston, and arranged in the wall of the chamber 64 are ports 68 and 70 providing communications between the chamber 64 and the annular chamber 52.

A plunger 72 reciprocable in the chamber 64 is retained against displacement by a washer 74 seated on an annular shoulder in the open end of the chamber and secured in place by a retaining ring 76 seated in a groove in the wall of the chamber. The plunger 72 has a concentric extension 78, adapted to enter and close the port 66, and a recess 80 in the back thereof for the reception of the operating means. Movement of the plunger 72 in the chamber 64 is limited by suitable cooperative stops indicated at 82.

When the plunger is advanced to close the port 66 in the head of the piston, the end of the extension enters the port 66 and abuts the sealing cup 60 so as to effectively seal the port. The extension 78 has sleeved thereon and seated on the head of the plunger a sealing cup 84 for inhibiting seepage of fluid from the chamber 64 past the plunger, and a piston 86 slidable on the extension is yieldingly supported by a spring 88 seated in the cup 84, and a sealing cup 90 seated on the head of the piston 86 is held against displacement by a spring 92 interposed between the cup and the back of the piston head 48. The spring 92 also serves to return the plunger to its retracted position.

A thrust pin 94 received by the recess 80 in the back of the plunger 72 has thereon a coupling 96 connected as by a flexible boot 98 to the open end of the cylinder 20 for the exclusion of dust and other foreign substances from the cylinder. A rod 100 connects the coupling to a foot pedal lever 102 pivotally supported on a bracket 104 and connected by a retractile spring 106 to a fixed support 108.

In a normal operation, upon depressing the foot pedal lever 102, force is transmitted therefrom through the rod 100 and thrust pin 94 to the plunger 72, resulting in advancing the plunger to its maximum allowable determined by the stops 82. During this movement of the plunger, the extension 78 enters and closes the port 66 in the head 48 of the piston 42 and abuts the sealing cup 60 to effectively seal the port. Thereafter the plunger and piston move as a single unit, and the fluid in the cylinder 20 forward of the piston is displaced therefrom, past the two-way valve 26, through the discharge port 24 and fluid delivery pipe 30 and the branches thereof into the fluid pressure actuated motors 32, causing energization of the motors, resulting in actuation of the shoes 38 of the respective brake structures into engagement with the drums.

At the conclusion of a braking operation, the foot pedal lever 102 is released and is returned to its retracted position under the influence of the retractile spring 106. This movement of the foot pedal lever retracts the rod 100 and thrust pin 94, resulting in release of the plunger 72 and consequent release of the piston 42, whereupon there is relative movement between the plunger and the piston due to the influence of the spring 92 urging the plunger to its retracted position wherein the port 66 is opened so as to establish communication between the chamber 64 and that portion of the cylinder 20 forward of the piston, and concomitantly with this relative movement of the piston and the plunger, the piston is returned to its retracted position under the influence of the spring 62.

As the piston 42 returns to its retracted position, a partial vacuum is created in that portion of the cylinder forward of the piston, resulting in drawing fluid from the reservoir through the port 28 into the annular chamber 52, thence through the passages 58 in the head 48 of the piston, past the sealing cup 60, into that portion of the cylinder forward of the piston, completely filling the cylinder, and during this period fluid is returning from the fluid pressure actuated motors 32 and the fluid pressure delivery pipe 30 and the branches thereof to the cylinder, under the influence of the retractile springs 40 connecting the shoes of the brakes.

This results in the cylinder receiving a quantity of fluid in excess of that required to completely fill the cylinder. Under this condition, the pressure on the fluid in the cylinder is received on the head of the piston 86 slidable on the extension of the plunger in the chamber 64, resulting in movement of the piston 86 against the resistance of the spring 88, so as to uncover the port 70 to permit excess fluid to escape from that portion of the cylinder forward of the piston through the port 66 in the head of the piston into the chamber 64, thence through the port 70 into the annular chamber, and from there through the port 28 into the reservoir. The piston 86 is then urged by the spring 88 to cover the port 70 and to impose a predetermined pressure on the fluid in the cylinder forward of the piston 42 so that in a subsequent operation all lost motion, such as advancing the piston to cover the compensating port, as in conventional devices of this character, may be avoided.

If the braking system is exposed to a decrease in temperature, the fluid in the lines and wheel cylinders contracts and such contraction is compensated for under normal conditions by piston 86 which advances toward the right as viewed in Figure 2 under the influence of the spring 88 to displace sufficient fluid from the chamber 64 through port 66 to compensate for such contraction. On the other hand, where the braking system is subjected to rise in temperature, the fluid in the lines and wheel cylinders expands and forces piston 86 toward the left to uncover the port 70 and permit the excess fluid to escape to the reservoir 12 by way of ports 70 and 28.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is:

1. A fluid pressure producing device comprising a cylinder, a piston reciprocable in the cylinder having a chamber therein provided with a port opening through the head of the piston, a plunger movable in the chamber having an extension adapted to enter and close the port, a piston movable on the extension, a spring for urging said piston to discharge fluid from said chamber and a pressure relief port controlled by said piston.

2. A fluid pressure producing device comprising a cylinder, a piston reciprocable in the cylinder having a reduced body portion providing an annular chamber, a chamber in the piston provided with ports communicating with the annular chamber and a port opening through the head of the piston, a plunger movable in the chamber having an extension adapted to enter and close the port opening through the head of the piston, a piston movable on the extension, a spring for urging said piston to discharge fluid from said chamber, and a pressure relief port controlled by said piston.

3. A fluid pressure producing device comprising a reservoir, a cylinder communicating therewith, a piston reciprocable in the cylinder having a reduced body portion providing an annular chamber communicating with the reservoir and that portion of the cylinder forward of the piston, a chamber in the piston communicating with the annular chamber and that portion of the cylinder forward of the piston, a plunger reciprocable in the chamber having a part adapted to close the communication between the chamber and that portion of the cylinder forward of the piston, a piston movable in the chamber, and a spring urging said piston to discharge fluid from said chamber, said piston controlling communication between the piston chamber and the annular chamber.

4. A fluid pressure producing device comprising a reservoir, a cylinder communicating therewith having a controlled discharge port, a piston reciprocable in the cylinder having a reduced body portion providing an annular chamber communicating with the reservoir, the head of the piston having controlled ports providing communications between the annular chamber and that portion of the cylinder forward of the piston, a chamber in the piston communicating with the annular chamber and with that portion of the cylinder forward of the piston, a plunger in the chamber having an extension adapted to close the communication between the chamber and that portion of the cylinder forward of the piston, a sealing cup seated on the head of the plunger, a piston resiliently supported on the extension, and a sealing cup on the head of the piston on the extension, said sealing cup controlling communication between the piston chamber and the annular chamber.

5. A fluid pressure producing device comprising a reservoir, a cylinder communicating therewith having a controlled discharge port, a piston reciprocable in the cylinder having a reduced body portion providing an annular chamber communicating with the reservoir and spaced ports in its head providing communications between the annular chamber and that portion of the cylinder forward of the piston, a sealing cup on the head of the piston controlling the ports therein, a chamber in the piston having spaced ports communicating with the annular chamber and a port opening through the head of the piston, a plunger reciprocable in the chamber having an extension adapted to enter and close the port in the head of the piston, a sealing cup on the plunger, a piston on the extension, a sealing cup carried by the piston on the extension, said last-named sealing cup controlling communication between the piston chamber and the annular chamber, a spring interposed between the sealing cup on the plunger and the piston on the extension, and a spring interposed between the cup carried by the piston on the extension and the head of the chamber.

HERBERT C. BOWEN.